(12) United States Patent
Canterbury

(10) Patent No.: US 7,137,893 B2
(45) Date of Patent: Nov. 21, 2006

(54) METHOD AND APPARATUS FOR WRITE PROTECTING A GAMING STORAGE MEDIUM

(75) Inventor: Stephen A. Canterbury, Antioch, IL (US)

(73) Assignee: WMS Gaming Inc., Waukegan, IL (US)

( * ) Notice: Subject to any disclaimer, the term of this patent is extended or adjusted under 35 U.S.C. 154(b) by 355 days.

(21) Appl. No.: 09/851,825

(22) Filed: May 9, 2001

(65) Prior Publication Data

US 2002/0169022 A1    Nov. 14, 2002

(51) Int. Cl.
*A63F 9/24* (2006.01)
(52) U.S. Cl. .................................................. 463/43
(58) Field of Classification Search ............. 463/29, 463/43, 44; 365/189.01, 4, 185.04, 189.07, 365/185.33
See application file for complete search history.

(56) References Cited

U.S. PATENT DOCUMENTS

| | | | | |
|---|---|---|---|---|
| 5,402,385 A | * | 3/1995 | Ozeki et al. | 365/230.01 |
| 5,497,450 A | * | 3/1996 | Helmbold et al. | 358/1.15 |
| 5,625,593 A | * | 4/1997 | Kimura | 365/189.05 |
| 5,668,760 A | | 9/1997 | Hazen | |
| 5,802,332 A | * | 9/1998 | Yokouchi | 712/220 |
| 5,912,849 A | * | 6/1999 | Yasu et al. | 365/195 |
| 6,034,889 A | * | 3/2000 | Mani et al. | 365/185.04 |
| 6,148,384 A | * | 11/2000 | Devanagundy et al. | 711/163 |
| 6,439,996 B1 | | 8/2002 | LeMay et al. | 463/29 |
| 6,488,581 B1 | | 12/2002 | Stockdale | 463/29 |
| 6,488,585 B1 | | 12/2002 | Wells et al. | 463/43 |
| 2002/0147042 A1 | * | 10/2002 | Vuong et al. | 463/40 |

FOREIGN PATENT DOCUMENTS

EP      0 431 723 A1    6/1991

* cited by examiner

*Primary Examiner*—Kim Nguyen
(74) *Attorney, Agent, or Firm*—Schwegman, Lundberg, Woessner & Kluth, P.A.

(57) ABSTRACT

A method and apparatus for write protecting a storage medium of a gaming machine is disclosed. The storage medium, which is preferably a removable compact flash memory, contains critical game data for operating the gaming machine. The storage medium includes a data register capable of receiving external data when at least one load condition of the data register is enabled. In the method and apparatus, an address of the storage medium selected by an external device is decoded. If the selected address matches an address of the data register, the load condition of the data register is disabled to thereby prevent writing to the data register.

22 Claims, 3 Drawing Sheets

Fig. 5
| A10 | A3 | A2 | A1 | A0 | D0-7 | D8-15 |
|---|---|---|---|---|---|---|
| 0 | 0 | 0 | 0 | X | DATA 0-7 | DATA 8-15 |
| 0 | 0 | 0 | 1 | X | SECTOR COUNT | SECTOR NUMBER |
| 0 | 0 | 1 | 0 | X | CYLINDER LOW | CYLINDER HIGH |
| 0 | 0 | 1 | 1 | X | SELECT CARD/HEAD | COMMAND |
| 0 | 1 | 0 | 0 | X | DATA 0-7 | DATA 8-15 |
| 0 | 1 | 0 | 1 | X | UNUSED | UNUSED |
| 0 | 1 | 1 | 0 | X | UNUSED | FEATURES |
| 0 | 1 | 1 | 1 | X | DEVICE CONTROL | UNUSED |
| 1 | X | X | X | X | DATA 0-7 | DATA 8-15 |
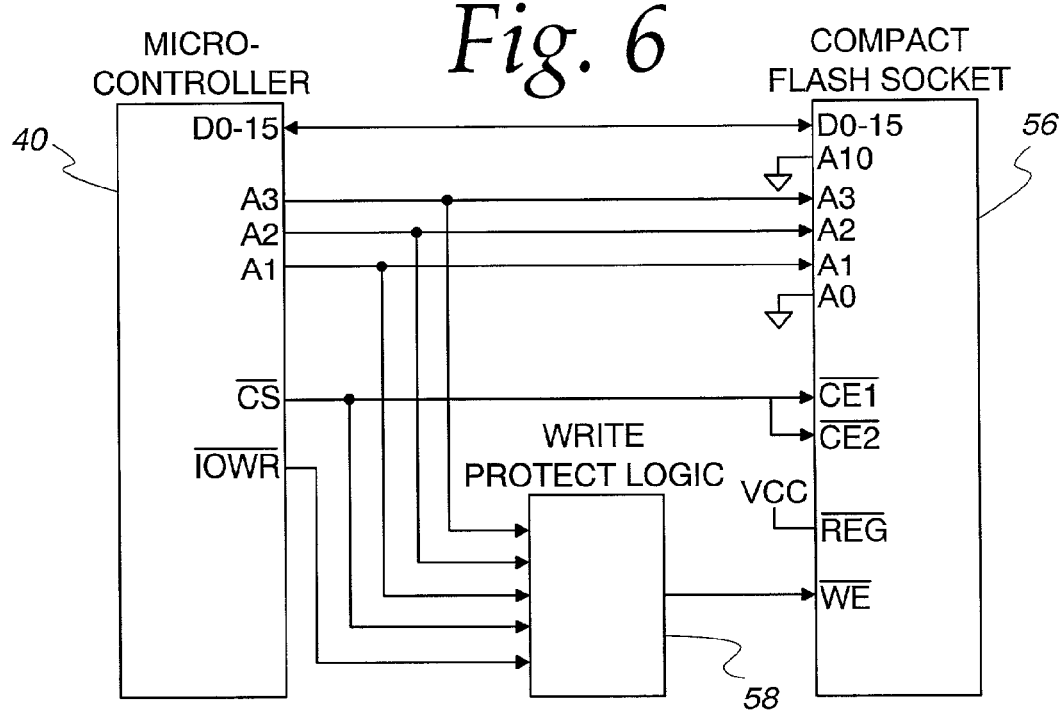
Fig. 6
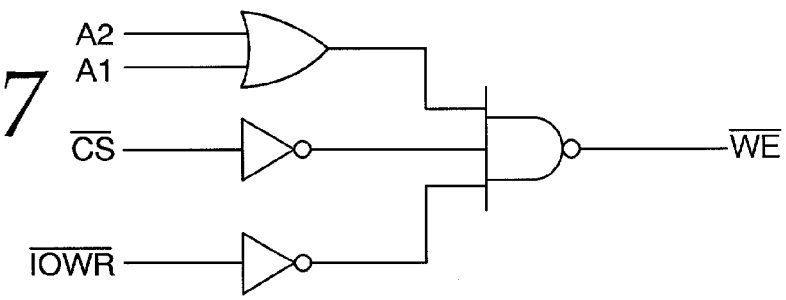
Fig. 7

METHOD AND APPARATUS FOR WRITE PROTECTING A GAMING STORAGE MEDIUM

FIELD OF THE INVENTION

The present invention relates generally to gaming machines operable to play games of chance and, more particularly, to a method and apparatus for write protecting a storage medium containing software code for a game of chance.

BACKGROUND OF THE INVENTION

Compact flash storage media, such as CompactFlash™ cards by SanDisk Corporation of Sunnyvale, Calif., are popular removable mass storage devices. The card is about the size of a matchbook and only weighs about half an ounce. The card was designed based on the popular PC Card (PCMCIA) standard and can easily be slipped into these sockets with the use of a low-cost adapter. The instant assignee has chosen to employ compact flash media to store game software code in its unique line of processor boards to be installed in electronic gaming devices operable to play games of chance, such as slots, poker, bingo, keno, and blackjack. The compact flash medium was chosen for the following reasons.

- It is an emerging standard for data storage in such products as digital cameras, digital music players, desktop computers, handheld PCs (HPCs), personal communicators, Palm PCs, Auto PCs, digital voice recorders, and photo printers, etc.
- It is housed in a small, easily removable package.
- It may be upgraded to larger memory sizes in the same package.
- It has no moving parts and, therefore, is extremely reliable.
- It has greater ESD immunity than the EPROM devices that are currently used in many gaming devices.
- The cost of the memory system is comparable to that of existing memory systems in gaming devices.

To use compact flash media for storing critical game data, jurisdictional requirements for electronic gaming devices state that the game code must be stored in a storage medium that is not alterable when the medium is installed. Storage media that have been or are being used to store the game code include EPROMs, CD ROM drives, and hard drives. While EPROMs and CD ROMs are not alterable when installed, a hard disk drive must be made to be write protected. This is typically done by physically cutting the wire that would carry a signal providing write pulses to the hard disk. Disabling writes to compact flash media in the same manner (i.e., cutting the wire carrying the write signal) is not feasible because the compact flash media are extremely small in size and are sealed.

SUMMARY OF THE INVENTION

A method and apparatus for write protecting a storage medium of a gaming machine is disclosed. The storage medium, which is preferably a removable compact flash memory, contains critical game data for operating the gaming machine. The storage medium includes a data register capable of receiving external data when at least one load condition of the data register is enabled. In the method and apparatus, an address of the storage medium selected by an external device is decoded. If the selected address matches an address of the data register, the load condition of the data register is disabled to thereby prevent writing to the data register.

BRIEF DESCRIPTION OF THE DRAWINGS

The foregoing and other advantages of the invention will become apparent upon reading the following detailed description and upon reference to the drawings.

FIG. 5 is a Task Register mapping for the compact flash medium when the compact flash medium is in the PC Card ATA Memory Mode.

FIG. 6 is a block diagram showing one possible way of interconnecting a 16-bit microcontroller and a compact flash socket in order to write protect the compact flash medium when it is inserted into the socket.

FIG. 7 is a set of possible logic for implementing a write protection logic block in FIG. 6.

Figure 1:
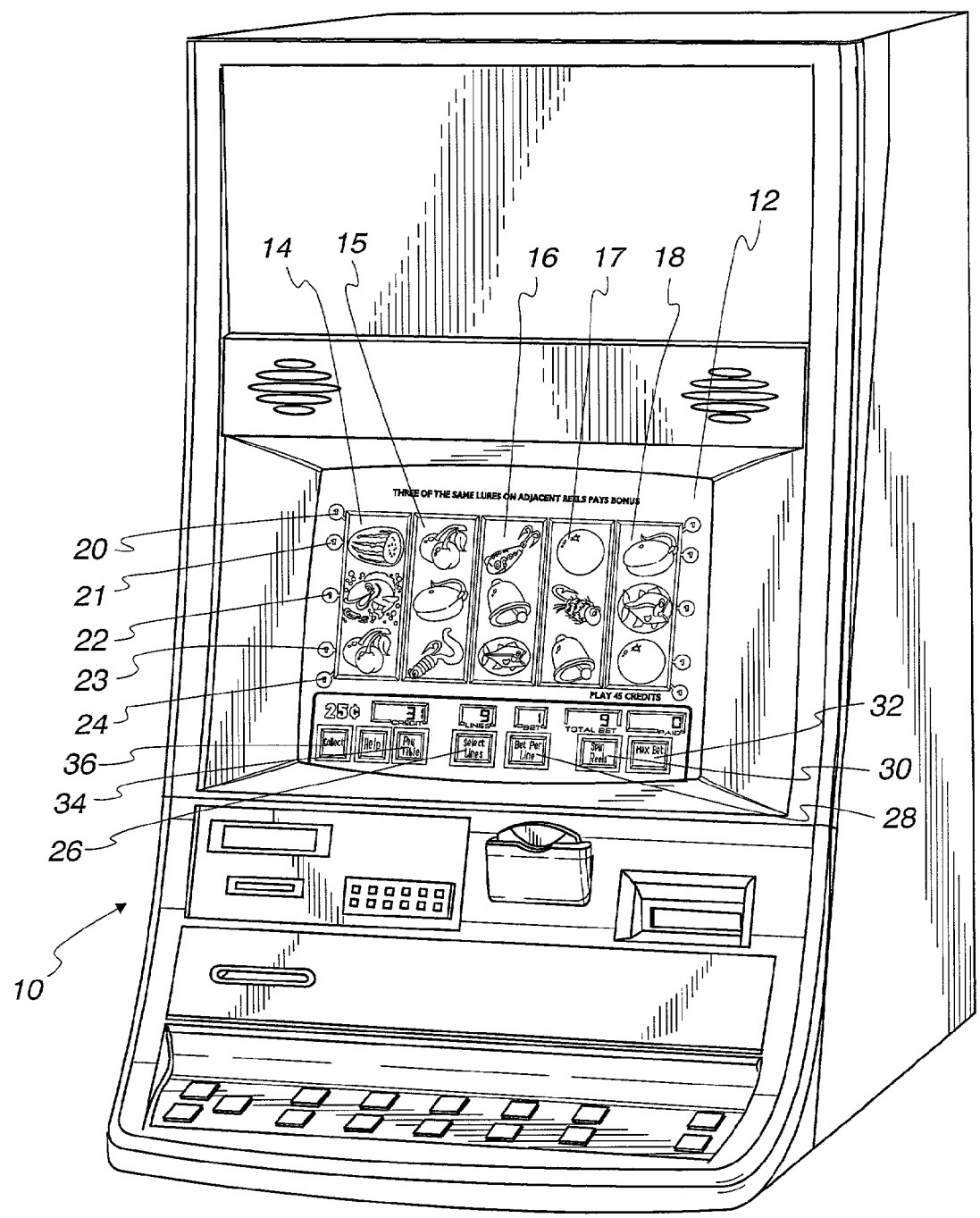
FIG. 1 is an isometric view of a gaming machine.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning to the drawings, FIG. 1 depicts a gaming machine 10 operable to play a game of chance, such as slots, poker, bingo, keno, and blackjack. The gaming machine 10 includes a visual display 12 preferably in the form of a dot matrix, CRT, LED, LCD, electro-luminescent, or other type of video display known in the art. The display 12 preferably includes a touch screen overlaying the monitor. Alternatively, the visual display 12 may be mechanical. In the illustrated embodiment, the gaming machine 10 is an "upright" version in which the display 12 is oriented vertically relative to the player. Alternatively, the gaming machine may be a "slant-top" version in which the display 12 is slanted at about a thirty degree angle toward the player of the gaming machine 10.

In one embodiment, the gaming machine 10 is operable to play a basic slot game with five simulated spinning reels 14, 15, 16, 17, 18 and a bonus game triggered by a start-bonus outcome in the basic game. If the visual display 12 is mechanical rather than video, the reels are mechanical rather than simulated. Each of five or more pay lines 20, 21, 22, 23, 24 extends through one symbol on each of the five reels. Generally, game play is initiated by inserting a number of coins or playing a number of credits, causing a central processing unit to activate a number of pay lines corresponding to the number of coins or credits played. In one embodiment, the player selects the number of pay lines (between one and five) to play by pressing a "Select Lines" key 26 on the video display 12. The player then chooses the number of coins or credits to bet on the selected pay lines by pressing a "Bet Per Line" key 28.

After activation of the pay lines, the reels 14–18 may be set in motion by touching a "Spin Reels" key 30 or, if the player wishes to bet the maximum amount per line, by using a "Max Bet Spin" key 32 on the video display 12. Alternatively, other mechanisms such as, for example, a lever or push button may be used to set the reels in motion. The central processing unit uses a random number generator to select a game outcome (e.g., "basic" game outcome) corresponding to a particular set of reel "stop positions." The central processing unit then causes each of the video reels to stop at the appropriate stop position. Video symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing a "Pay Table" button 34). A winning basic game outcome occurs when the symbols appearing on the reels 14–18 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing a "Collect" button 36. In one implementation, the winning combinations start from the first reel 14 (left to right) and span adjacent reels. In an alternative implementation, the winning combinations start from either the first reel 14 (left to right) or the fifth reel 18 (right to left) and span adjacent reels.

Included among the plurality of basic game outcomes is a start-bonus outcome for triggering play of a bonus game. A start-bonus outcome may be defined in any number of ways. For example, a start-bonus outcome may occur when a special start-bonus symbol or a special combination of symbols appears on one or more of the reels 14–18. The start-bonus outcome may require the combination of symbols to appear along an active pay line or, alternatively, may require that the combination of symbols appear anywhere on the display regardless of whether the symbols are along an active pay line. The appearance of a start-bonus outcome causes the central processing unit to shift operation from the basic game to the bonus game.

The bonus game may be played on the video display 12 or a secondary mechanical or video bonus indicator distinct from the video display 12. If the bonus game is played on the video display 12, the bonus game may utilize the reels 14–18 or may replace the reels with a different display image. The bonus game may be interactive and require a player to make one or more selections to earn bonus amounts. Also, the bonus game may depict one or more animated events and award bonus amounts based on an outcome of the animated events. Upon completion of the bonus game, the central processing unit shifts operation back to the basic slot game.

Figure 2:
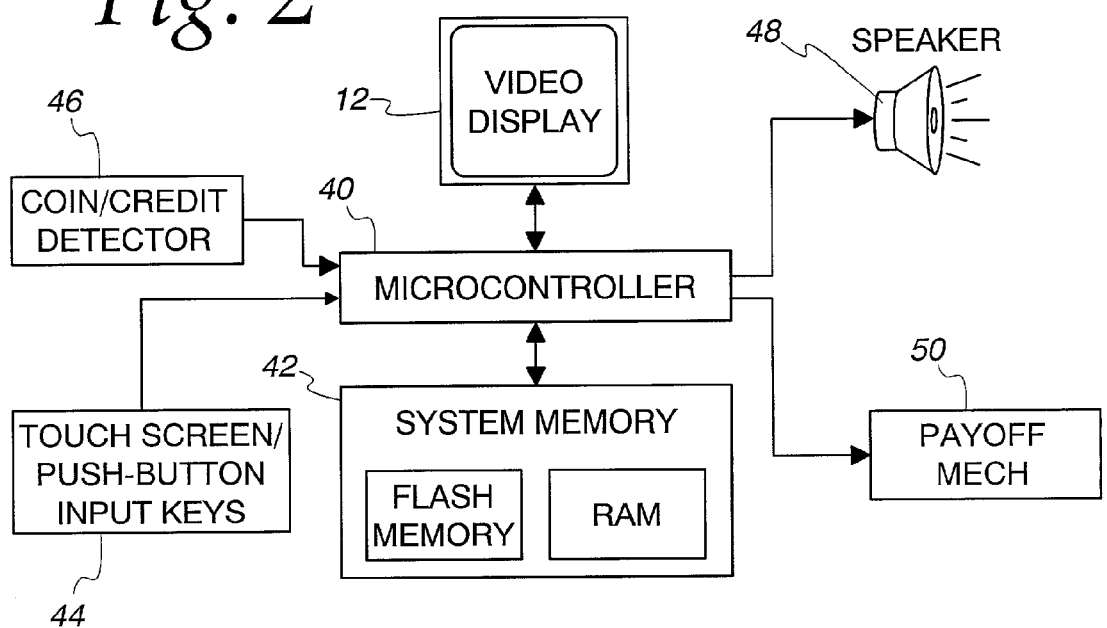
FIG. 2 is a block diagram of a control system suitable for operating the gaming machine.

FIG. 2 is a block diagram of a control system suitable for operating the gaming machine. The control system includes a central processing unit with a microcontroller 40 and system memory 42. The memory 42 preferably comprises a removable flash memory and battery-backed random-access memory (RAM). The removable flash memory is preferably a compact flash storage medium and is used to store game-related data associated with the game of chance played on the gaming machine. The game-related data may, for example, include game code, math tables, a random number generator, and audiovisual resources. The player may select an amount to wager and other game play functions via touch screen or push-button input keys 44. The wager amount is signaled to the microcontroller 40 by a coin/credit detector 46. In response to the wager, the microcontroller 40 executes the game code which, based on a randomly determined outcome, selectively accesses the audiovisual resources to be shown on the video display 12 and played through one or more audio speakers 48 mounted to a housing of the gaming machine. If the outcome corresponds to a winning outcome typically identified on a pay table, the microcontroller 40 instructs a payoff mechanism 50 to award a payoff for that winning outcome to the player in the form of coins or credits.

Figure 3:
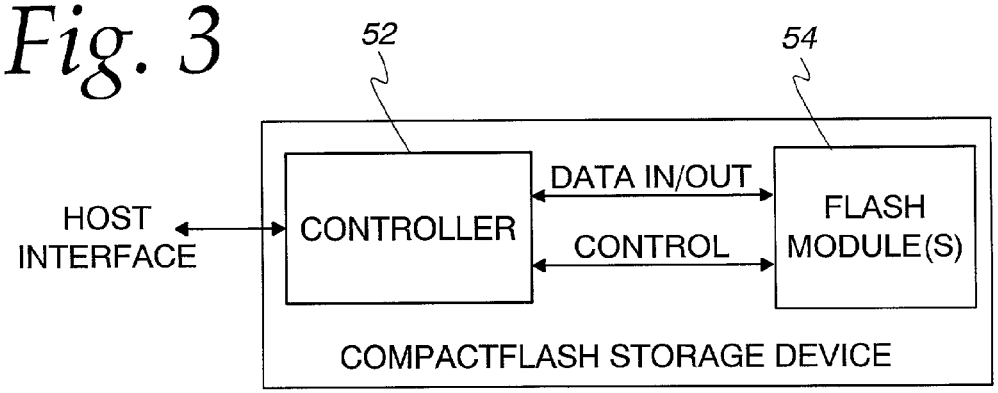
FIG. 3 is a block diagram of the architecture of a compact flash storage medium.

FIG. 3 is a block diagram of the architecture of the compact flash medium included in the system memory 42. The compact flash medium is preferably implemented with a CompactFlash™ card available from various companies such as SanDisk Corporation of Sunnyvale, Calif. The term "compact flash medium" in this description refers to any device with an interface equivalent that is used as a storage medium. The compact flash medium is approximately the size of a matchbook with a 50-pin connector consisting of two rows of 25 female contacts. Internal to the compact flash medium is a single chip controller 52 and one or more flash memory modules 54. The controller 52 provides an interface between a host system and the flash memory modules 54.

The compact flash medium has three types of host interface operational modes: (1) PC card ATA Memory Mode, (2) PC card ATA I/O Mode, and (3) True IDE Mode. Several of the signals on the 50-pin connector change definition based on the interface type chosen. The compact flash medium defaults to PC card ATA Memory Mode unless the -OE pin of the compact flash medium is logic low (grounded) when power is cycled to the medium, which then places the medium in True IDE Mode.

The PC card ATA I/O Mode is set by changing a Configuration Option Register to one of three I/O access modes, which are: (1) I/O mapped to any 16 byte boundary, (2) I/O mapped to 0x1F0–0x1F7 and 0x376–0x377, and (3) I/O mapped to 0x170–0x177 and 0x376–0x377. The compact flash medium must be set to PC card ATA I/O Mode from PC card ATA Memory Mode during programming to facilitate a PC card ATA I/O Mode interface The write protection technique described below does not allow data in the compact flash medium to be altered once installed into a socket on a circuit board that utilizes this technique. This allows the medium to be used to store critical game data.

Regardless of the interface type, data is written to the compact flash medium via a sequence of loading the required parameters, such as the cylinder number or sector count, into appropriate registers, loading the desired command into a Command Register, and then loading data into a Data Register(s). These registers as a whole are often referred to as "Task Registers." The loading of this information is typically performed by a microprocessor or microcontroller device that is connected either directly or via some additional circuitry to the interface of the compact flash medium. If the loading of data into the Data Register is blocked or masked by circuitry, then alteration of the compact flash medium's data can never occur. Any attempt to perform a write sequence will lock up the compact flash medium because the medium's controller 52 will be waiting for a number of data loads into the Data Register that can never occur.

A preferred implementation utilizes the PC Card ATA Memory Mode interface with a 16-bit data path. With this interface type, the minimum signals required for loading data into the Task Registers consist of 16 data lines (D00–D15), 5 address lines (A0–A3 and A10), two active low card enable signals (-CE1 and -CE2), the active low write enable strobe (-WE), and the active low attribute memory select signal (-REG).

Figure 4:
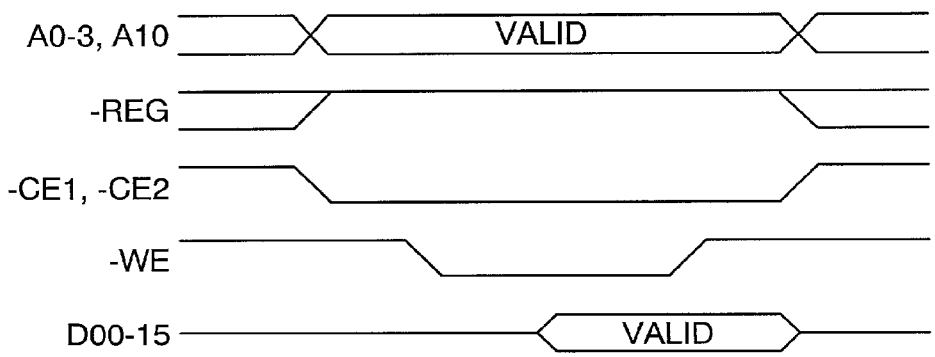
FIG. 4 is a timing diagram for loading data into Task Registers of the compact flash medium using a PC Card ATA Memory Mode interface.

FIG. 4 is a timing diagram for loading data into the Task Registers using the 16-bit PC Card ATA Memory Mode interface. The valid data on the D00–D15 data lines are loaded on the rising edge of the -WE signal. Both card enable signals (-CE1 and -CE2) must be active low prior to the write enable strobe to indicate a 16-bit transfer. The attribute memory select signal (-REG) must also be inactive prior to the write enable strobe being active. If the -REG signal were low, then the transfer would be to the Configuration Registers of the compact flash medium (access to these registers would not have to be masked to ensure the integrity of the device data). Finally, the address lines will point to the Task Register that the controlling device (a microprocessor or microcontroller) is attempting to load. It should be noted that the PC Card ATA Memory Mode does not use address lines A4–A9.

FIG. 5 shows the Task Register that is selected based on the address lines. The highlighted selections are the possibilities for selection of the Data Register. The Data Register is the register that must be blocked from being loaded in order to write protect the compact flash medium. From FIG. 5, it can be seen that there are three address ranges that access the Data Register when the compact flash medium is in the PC Card ATA Memory Mode. The first occurs when address lines A10 and A3–A1 are all low (the level of address A0 does not matter because all transfers are 16 bits). The second occurs when address lines A10, A2, and A1 are low and A3 is a high. Finally, the last occurs whenever address line A10 is high.

FIG. 6 is a block diagram that illustrates one possible way of interconnecting a 16-bit microcontroller 40 and a compact flash socket 56 in order to write protect the compact flash medium when it is inserted into the socket 56. The block on the left represents the 16-bit microcontroller 40 with a generic set of interface pins shown (any standard microprocessor or microcontroller could be used with some additional circuitry possibly being required to provide the basic interface depicted). The block on the right represents a 50-pin compact flash medium socket 56 with a 16-bit PC card ATA Memory Mode interface (only the interface pins relevant to the write protection technique are being shown). The smaller block represents additional write protection logic 58 required. The write protection logic 58 could be implemented using a single device or several devices.

The technique depicted in FIG. 6 stops two of the three Data Register load conditions from occurring by decoding the -IOWR strobe from the microcontroller 40 and the address lines from the microcontroller 40 that are tied to the compact flash socket's A1–A3 lines and then blocking the -WE signal from occurring. The third Data Register load condition is blocked by tying address signal A10 of the compact flash socket 56 to ground.

FIG. 7 is a set of possible logic for implementing the write protection logic block 58 in FIG. 6. This logic allows the -WE signal to become active (low) only when A2 or A1 is a logic '1,' which are the conditions that are allowable in FIG. 5 as long as A10 is a logic '0.' A single device or multiple devices could implement the logic shown in FIG. 7. Other equivalent circuits may also be devised.

Another technique for write protecting the compact flash medium is to block the loading of the Data Register by disabling the -CE1 and -CE2 signals from being active when the address lines are selecting the Data Register. This technique is effective provided that the timing requirements of the compact flash medium are met.

A technique of write protecting the compact flash medium when the medium is inserted into a socket on a gaming circuit board has been discussed. This technique involves circuitry that blocks writing to the Data Register of the compact flash medium by disabling loads of the Data Register. A full explanation of how this is achieved when a 16-bit PC Card ATA Memory Mode interface has also been provided. This write protection technique may also be modified to work for any of the other interface types that the compact flash medium supports. The write protection technique is applicable regardless of the interface type (PC card ATA Memory Mode, PC card ATA I/O Mode, or True IDE Mode) or data width (8 or 16 bits) used.

While the present invention has been described with reference to one or more particular embodiments, those skilled in the art will recognize that many changes may be made thereto without departing from the spirit and scope of the present invention. For example, the compact flash medium may be replaced with a compact storage device, such as a compact disk drive, similar in size to the compact flash medium and having the same interface. An example of such a compact disk drive is the IBM Microdrive™ commercially available from International Business Machines. Each of these embodiments and obvious variations thereof is contemplated as falling within the spirit and scope of the claimed invention, which is set forth in the following claims.

What is claimed is:

1. A method comprising:
    write protecting a storage medium that includes game data for operating a gaming machine such that the game data is not alterable through use of circuitry or programming of the gaming machine, the storage medium including a data register capable of receiving external data after one or more load conditions of the data register are enabled, the write protecting including,
        decoding an address of the storage medium, wherein the address is selected by an external device; and
        if the selected address matches an address of the data register, disabling at least one of the one or more load conditions of the data register.

2. The method of claim 1, wherein the at least one of the one or more load conditions includes a write enable input of the storage medium.

3. The method of claim 1, wherein the at least one of the one or more load conditions includes card enable inputs of the storage medium.

4. The method of claim 1, wherein the one or more load conditions include a plurality of load conditions, wherein the data register is capable of receiving the external data when the plurality of load conditions are enabled, and wherein the disabling the at least one load condition includes disabling one or more of the plurality of load conditions.

5. The method of claim 4, wherein the disabling the at least one of the one or more load conditions includes disabling one of the plurality of load conditions.

6. The method of claim 4, wherein the disabling the at least one of the one or more load conditions includes disabling two of the plurality of load conditions.

7. An apparatus for write protecting a storage medium of a gaming machine, the apparatus comprising:
   means for decoding an address of the storage medium, the address selected by an external device, the storage medium containing game data for operating a gaming machine, and the storage medium including a data register capable of receiving external data after one or more load conditions of the data register are enabled; and
   means for disabling at least one of the one or more load conditions of the data register if the selected address matches an address of the data register such that the game data is not alterable through use of circuitry or programming of the gaming machine.

8. The apparatus of claim 7, wherein the at least one of the one or more load conditions includes a write enable input of the storage medium.

9. The apparatus of claim 7, wherein the at least one of the one or more load conditions includes card enable inputs of the storage medium.

10. The apparatus of claim 7, wherein the one or more load conditions include a plurality of load conditions, wherein the data register is capable of receiving the external data when the plurality of load conditions are enabled, and wherein the means for disabling the load condition disables one or more of the plurality of load conditions.

11. A gaming machine comprising:
   a processor;
   a storage medium for storing game data and including a data register capable of receiving external data when a load condition of the data register is enabled; and
   write protection logic for decoding an address of the storage medium, the address selected by an external device and, if the selected address matches an address of the data register, disabling the load condition of the data register such that the game data is not alterable through use of circuitry or programming of the gaming machine.

12. The gaming machine of claim 11, wherein the storage medium includes removable memory.

13. The gaming machine of claim 11, wherein the load condition includes a write enable input of the storage medium.

14. The gaming machine of claim 11, wherein the load condition includes card enable inputs of the storage medium.

15. The gaming machine of claim 11, wherein the load condition includes a plurality of load conditions such that the data register is capable of receiving the external data only when the plurality of load conditions are enabled, and wherein the disabling the load condition includes disabling one or more of the plurality of load conditions.

16. A method for write protecting a gaming machine storage medium, the method comprising:
   preventing a write operation, wherein the write operation includes loading data into a data register of the gaming machine storage medium, and wherein the loading cannot be performed if a load condition of the data register is disabled, and wherein the preventing the write operation includes,
      receiving an address of the data register from a device external to the gaming machine storage medium; and
      disabling the load condition of the data register.

17. The method of claim 16, wherein the gaming machine storage medium is a removable memory.

18. The method of claim 17, wherein the receiving and the disabling are performed by a write-protection device connected to an interface of the removable memory.

19. The method of claim 17, wherein the removable memory includes a 50-pin connector, a single-chip controller, and one or more flash memory modules.

20. A machine-readable medium including instructions, which when executed by a gaming machine, cause the gaming machine to perform operations comprising:
   preventing a write operation, wherein the write operation includes loading data into a data register of the gaming machine storage medium, and wherein the loading cannot be performed if a load condition of the data register is disabled, and wherein the preventing the write operation includes,
      receiving an address of the data register from a device external to the gaming machine storage medium; and
      disabling the load condition of the data register.

21. The machine-readable medium of claim 20, wherein the gaming machine storage medium is a removable memory.

22. A gaming machine including:
   a removable storage medium; and
   a write-protection device for preventing a write operation to the removable storage medium, wherein the write operation includes loading data into a data register of the removable storage medium, and wherein the loading cannot be performed if a load condition of the data register is disabled, and wherein the preventing the write operation includes,
      receiving an address of the data register from a device external to the removable storage medium; and
      disabling the load condition of the data register.

* * * * *